United States Patent
Hu et al.

(10) Patent No.: US 12,472,449 B2
(45) Date of Patent: Nov. 18, 2025

(54) OIL-WATER SEPARATION DEVICE

(71) Applicants: CHINA PETROLEUM & CHEMICAL CORPORATION, Beijing (CN); SINOPEC EXPLORATION & PRODUCTION RESEARCH INSTITUTE, Beijing (CN)

(72) Inventors: Changchao Hu, Beijing (CN); Xiaoxuan Xu, Beijing (CN); Wei Dang, Beijing (CN); Pengyuan Ding, Beijing (CN); Xingwang Wang, Beijing (CN); Zhiwei Tang, Beijing (CN); Wenjie Tan, Beijing (CN); Lili Wang, Beijing (CN); Yanxiao Si, Beijing (CN); Caixia Bi, Beijing (CN)

(73) Assignees: CHINA PETROLEUM & CHEMICAL CORPORATION, Beijing (CN); SINOPEC EXPLORATION & PRODUCTION RESEARCH INSTITUTE, Beijing (CN)

( * ) Notice: Subject to any disclaimer, the term of this patent is extended or adjusted under 35 U.S.C. 154(b) by 457 days.

(21) Appl. No.: 18/005,007

(22) PCT Filed: Oct. 30, 2020

(86) PCT No.: PCT/CN2020/125249
§ 371 (c)(1),
(2) Date: Jan. 10, 2023

(87) PCT Pub. No.: WO2022/007260
PCT Pub. Date: Jan. 13, 2022

(65) Prior Publication Data
US 2023/0330563 A1     Oct. 19, 2023

(30) Foreign Application Priority Data

Jul. 10, 2020 (CN) .......................... 202010663145.5

(51) Int. Cl.
*B01D 17/04*     (2006.01)
*B01D 17/02*     (2006.01)
(Continued)

(52) U.S. Cl.
CPC ........ *B01D 17/045* (2013.01); *B01D 17/0211* (2013.01); *B01D 17/0214* (2013.01);
(Continued)

(58) Field of Classification Search
CPC .............. B01D 17/045; B01D 17/0211; B01D 17/0214; B01D 21/0045; C02F 1/40; C02F 2101/32; C02F 2103/10; C02F 2201/002
See application file for complete search history.

(56) References Cited

U.S. PATENT DOCUMENTS 3,563,389 A * 2/1971 Mizrahi ............. B01D 17/0208
                                                 210/521
3,914,175 A * 10/1975 Kunz ................... B01D 17/045
                                                 210/522

(Continued)

FOREIGN PATENT DOCUMENTS

CN       102399041 A     4/2012
CN       103752042 A *   4/2014
(Continued)

*Primary Examiner* — Liam Royce
(74) *Attorney, Agent, or Firm* — NKL Law; Allen Xue

(57) ABSTRACT

An oil-water separation apparatus has a housing that contains at least one longitudinal plate member arranged in a longitudinal direction of the housing (10) and inclined relative to a horizontal direction. The longitudinal plate member forms at least one fluid channel in an inner chamber of the housing. A first guiding hole is provided on the
(Continued)

longitudinal plate member or between the longitudinal plate member and an inner wall of the housing, and is in communication with the fluid channel. A second guiding hole is provided on the longitudinal plate member or between the longitudinal plate member and the inner wall of the housing, and is in communication with the fluid channel and is placed lower than the first guiding hole is positioned. A collection pipe is arranged at a longitudinal downstream end of the housing, and is in communication with the inner chamber of the housing.

11 Claims, 2 Drawing Sheets

(51) Int. Cl.
    *B01D 21/00*     (2006.01)
    *C02F 1/40*     (2023.01)
    *C02F 101/32*     (2006.01)
    *C02F 103/10*     (2006.01)

(52) U.S. Cl.
    CPC ............ *C02F 1/40* (2013.01); *B01D 21/0045* (2013.01); *C02F 2101/32* (2013.01); *C02F 2103/10* (2013.01); *C02F 2201/002* (2013.01)

(56) References Cited

U.S. PATENT DOCUMENTS

| | | | |
|---|---|---|---|
| 4,643,834 A | * | 2/1987 | Batutis .................. B01D 17/04 |
| | | | 210/522 |
| 5,520,825 A | | 5/1996 | Rice |
| 8,985,343 B1 | | 3/2015 | Mohr |

FOREIGN PATENT DOCUMENTS

| | | | | |
|---|---|---|---|---|
| CN | 204138385 U | | 2/2015 | |
| CN | 204803041 U | | 11/2015 | |
| CN | 105776710 A | | 7/2016 | |
| CN | 106986418 A | | 7/2017 | |
| CN | 108148622 A | | 6/2018 | |
| CN | 109395433 A | | 3/2019 | |
| CN | 111348769 A | * | 6/2020 | ............... C02F 1/40 |
| DE | 3208054 A1 | | 9/1983 | |
| GB | 2374028 A | | 10/2002 | |
| RU | 64278 U1 | | 6/2007 | |
| RU | 2555103 C2 | | 7/2015 | |
| RU | 195516 U1 | | 1/2020 | |
| WO | 2003000377 A1 | | 1/2003 | |

* cited by examiner

OIL-WATER SEPARATION DEVICE

CROSS REFERENCE OF RELATED APPLICATION

This application is a U.S. national stage entry of PCT international application No. PCT/CN2020/125249, filed on Oct. 30, 2020, which claims the priority of Chinese patent application No. 202010663145.5 entitled "An oil-water separation device" and filed on Jul. 10, 2020, the entire content of which is incorporated herein by reference.

TECHNICAL FIELD

The present invention relates to an oil-water separation device, in particular to a device for separating oil phase from a mixture. More specifically, the present invention relates to an oil-water separation device for wellhead produced fluid in oilfields.

TECHNICAL BACKGROUND

Separation of individual phases from a mixture containing multiple phases is a common technique in modern industry, and has been widely used in various fields. For example, in municipal and industrial wastewater treatments, it is often necessary to perform separation on waste water containing oil and suspended solids before subsequent treatments.

In addition, in the oil production industry, phase separation of oilfield produced fluid is an important technology. In particular, as oilfield development enters a high water-cut period, it is often necessary to transport the high water-cut produced fluid over a long distance to a combined station, for centralized heating and dehydrating treatments. The produced water that has been successfully treated and thus is acceptable is then sent back to the water injection station, for water injection in future. The above-mentioned centralized treatment mode for high water-cut produced fluid suffers problems such as high energy consumption, overload operation at some stations, or the like. Therefore, it is barely suitable for the water-based treatment demand in the high water-cut development stage.

In order to solve the problems caused by the above-mentioned centralized treatment mode, the downhole water separation technology has been developed. Generally, a downhole cyclone separation device is used to drive the oilwell mixed fluid in rotation at a high speed, so that the oil and water can be separated from each other by the principles of density difference and gravity separation. In this manner, low water-content oil is lifted to the ground, while low oil-content produced water (having an oil content of about 300 mg/L) is injected back into the injection layer. Accordingly, synchronous injection and production can be realized in the same wellbore, so that one well can be used for two purposes. This technology has been used in the industry. However, the above-mentioned method has problems such as high requirements on the wellbore structure, difficulties in monitoring the downhole separation effect, high equipment costs or the like. Therefore, the technology is developed slowly, and difficult to popularize and implement.

SUMMARY OF THE INVENTION

The present invention aims to provide a wellhead oil-water separation device. In particular, the present invention aims to provide a device for phase separation of oilfield wellhead produced fluid. The device has a simple structure, a small footprint, no need for additives or oxygen exposure, and can realize on-site water separation and on-site treatment of the wellhead produced fluid through physical methods under airtight conditions, so as to save investment, reduce operating costs and increase economic efficiency.

According to the present invention, an oil-water separation device is proposed, comprising: a housing; at least one longitudinal plate member inclined relative to a horizontal direction and arranged along a longitudinal direction of the housing, which forms at least one flow channel in an inner chamber of the housing; a first guiding hole, provided on the longitudinal plate member or between the longitudinal plate member and an inner wall of the housing, which is in communication with the flow channel; a second guiding hole, provided on the longitudinal plate member or between the longitudinal plate member and the inner wall of the housing, which is in communication with the flow channel and has a geometric position lower than that of the first guiding hole; and a collection pipe, arranged at a longitudinal downstream end of the housing, which is in communication with the inner chamber of the housing through a top wall of the housing.

The oil-water separation device is arranged at the wellhead of an oilfield to receive the wellhead produced fluid. The longitudinal plate member is arranged in the inner chamber of the housing. When the oil produced fluid flows longitudinally in the housing, small oil droplets dispersed in the water become larger ones through collision coalescence and wetting coalescence, which float up along the lower surface of the inclined longitudinal plate member under the action of buoyancy to an upper space of the housing through the first guiding hole, so as to form an oil layer, which is collected by a plurality of collection tubes and then discharged. Fine suspended solids in the water collide and coalesce with each other so that the particle sizes thereof become larger. Then, these suspended solids slide down along an upper surface of the longitudinal plate member under the action of gravity, finally sinking to a lower space of the housing through the second guiding hole. Water flows in a middle portion of the housing. Accordingly, effective oil-water separation and preliminary separation of water and suspended solids can be achieved.

According to a preferred embodiment of the present invention, each longitudinal plate member comprises two profiled plates arranged opposite to each other with an interval therebetween, each profiled plate having an inner end higher than an outer end thereof so that it is arranged obliquely. Each profiled plate includes a profiled head part, a profiled middle part and a profiled tail part that are connected with each other in sequence in a direction from the inner end to the outer end, wherein the first guiding hole is formed between the profiled head parts of said two profiled plates in pair, while the second guiding hole is formed between each of the profiled tail parts and the inner wall of the housing.

According to a preferred embodiment of the present invention, a lipophilic coating is applied on a lower surface of the profiled plate.

According to a preferred embodiment of the present invention, a plurality of longitudinal plate members spaced from each other is stacked one above another in the inner chamber of the housing, the first guiding holes formed by different longitudinal plate members being in through communication with each other.

According to a preferred embodiment of the present invention, an angle formed by a line connecting two ends of the profiled head part located above and the horizontal direction is larger than that formed by a line connecting two ends of the profiled head part located below and the horizontal direction. As an addition or alternative, in a direction from top to bottom, an angle formed by a line connecting two ends of the profiled tail part and the horizontal direction gradually increases.

According to a preferred embodiment of the present invention, in the direction from top to bottom, a vertical distance between two adjacent profiled middle parts gradually decrease or are the same.

According to a preferred embodiment of the present invention, the profiled middle part of at least one of the longitudinal plates located below is provided with a communication hole which is in communication with flow channels above and under said profiled middle part.

According to a preferred embodiment of the present invention, the profiled middle part includes a plurality of folded-line segments that are not on a same straight line, two adjacent folded-line segments being fixedly connected with each other.

According to a preferred embodiment of the present invention, an angle formed between the upper surfaces of two adjacent folded-line segments is in a range of 130 to 240 degrees.

According to a preferred embodiment of the present invention, an angle formed by a line connecting two ends of the profiled head part and the horizontal direction is in the range of 30 to 85 degrees; and/or, an angle formed by a line connecting two ends of the profiled tail part and the horizontal direction is in a range of 30 to 85 degrees; and/or an angle formed by a line connecting two ends of the profiled middle part and the horizontal direction is in a range of 15 to 60 degrees; and/or a plurality of collection pipes longitudinally spaced from each other is arranged at the downstream end of the housing, the distance between two adjacent collection pipes being equal or gradually increased in a direction from upstream to downstream.

BRIEF DESCRIPTION OF DRAWINGS

The above and other objects, features and advantages of the present invention will become more apparent through detailed description on exemplary embodiments of the present invention with reference to the accompanying drawings. In the drawings.

In the drawings, the same reference numbers are used to indicate the same components. The drawings are not drawn to actual scale.

DETAILED DESCRIPTION OF EMBODIMENTS

The present invention will be further described below with reference to the accompanying drawings. For the convenience of understanding, the principle of the present invention will be described below in conjunction with a device for phase separation of oilfield wellhead produced fluid (with main phases of oil, water and suspended solids).

Figure 1:
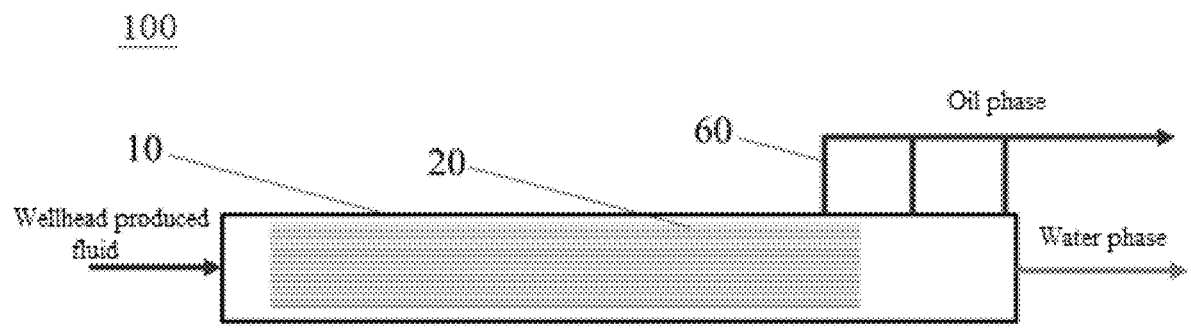
FIG. 1 shows an oil-water separation device according to an embodiment of the present invention.

FIG. 1 shows an oil-water separation device 100 according to an embodiment of the present invention. The oil-water separation device 100 is arranged at the wellhead, for separating the oilfield produced fluid delivered therein to output an oil phase and a mixed phase consisting of water and suspended solids.

Figure 2:
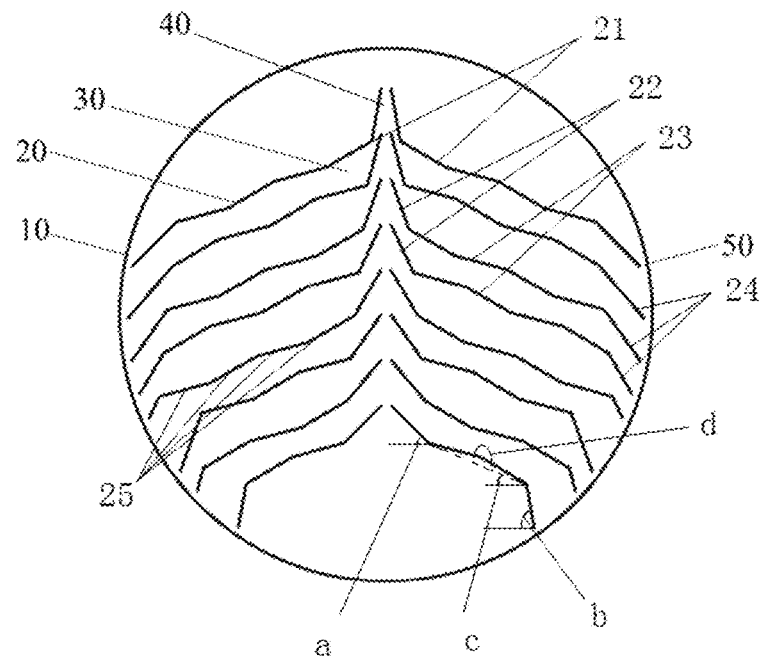
FIG. 2 shows an axial sectional view of the oil-water separation device according to the embodiment of the present invention.

As shown in FIG. 1, the oil-water separation device 100 is configured as a horizontal separation device, including a substantially cylindrical housing 10. It should be noted that in other embodiments not shown, the housing 10 may also be formed in a quadrangular shape, or other shapes. At least one longitudinal plate member 20 is arranged within the housing 10. The longitudinal plate member 20 extends along a longitudinal direction of the housing 10 (that is, the left-right direction in FIG. 1), and is arranged obliquely relative to the horizontal direction (that is, the left-right direction in FIG. 2), so as to form at least one fluid channel 30 in an inner chamber of the housing 10, as shown in FIG. 2. A first guiding hole 40 is provided on the longitudinal plate member 20, or formed between the longitudinal plate member 20 and an inner wall of the housing 10. Meanwhile, a second guiding hole 50 is provided on the longitudinal plate member 20, or formed between the longitudinal plate member 20 and the inner wall of the housing 10. Both the first and second guiding holes 40, 50 are in communication with the fluid channel 30. Moreover, a geometric position of the second guiding hole 50 is lower than that of a corresponding first guiding hole 40. A collection pipe 60 is arranged at a downstream end of the housing 10, and is in communication with an upper space of the housing 10 for delivering the oil phase stored there to the outside. The downstream end of the housing 10 is used to deliver a mixed phase of water and suspended solids to the outside.

In operation, the fluid to be separated (i.e., oilfield wellhead produced fluid in this embodiment) enters the flow channel 30 through an inlet (i.e., a left port in FIG. 1) of the oil-water separation device 100. After the fluid flows through the flow channel 30, small oil droplets will gather on a lower surface of the longitudinal plate member 20 through collision coalescence and wetting coalescence, and then continue to gather to form an oil film, which floats up under the action of buoyancy to the upper space of housing 10 through the first guiding hole 40. After the fluid flows through the flow channel 30, the suspended solids in the water will collide and coalesce with each other so that the particle sizes thereof become larger. Then, the suspended solids slide down along an upper surface of the longitudinal plate member 20 under the action of gravity, finally sinking to a lower space of the housing 10 through the second guiding hole 50. In this manner, the separated oil phase will be output through the collection pipe 60, while the mixed phase of water carried with suspended solids will flow out from the outlet at the downstream end (i.e., the right end in FIG. 1) of the oil-water separation device 100. The oil-water separation device 100 can realize on-site water separation and on-site treatment of the wellhead produced fluid, avoiding problems such as long-distance round-trip delivery of the produced water or the like. With this oil-water separation device 100, the downhole water separation technology is transferred to be performed at a bottom surface of the wellhead, thus effectively circumventing the restrictions of the downhole water separation technology. At the same time, the oil-water separation device 100 is rarely restricted by the well site conditions and other operation limitations, thus can be conveniently applied to any well site if needed. Furthermore, the oil-water separation device 100 per se requires a simple structure, a simple process, a low investment, and a small footprint, so that it can satisfactorily meet the needs of on-site water separation of wellhead produced fluid.

Figure 3:
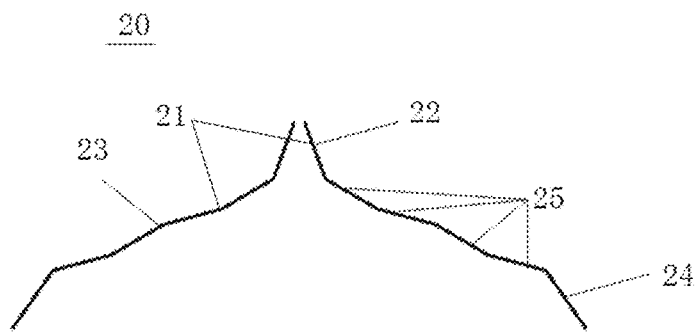
FIG. 3 shows an axial sectional view of a longitudinal plate according to an embodiment of the invention.
Figure 4:
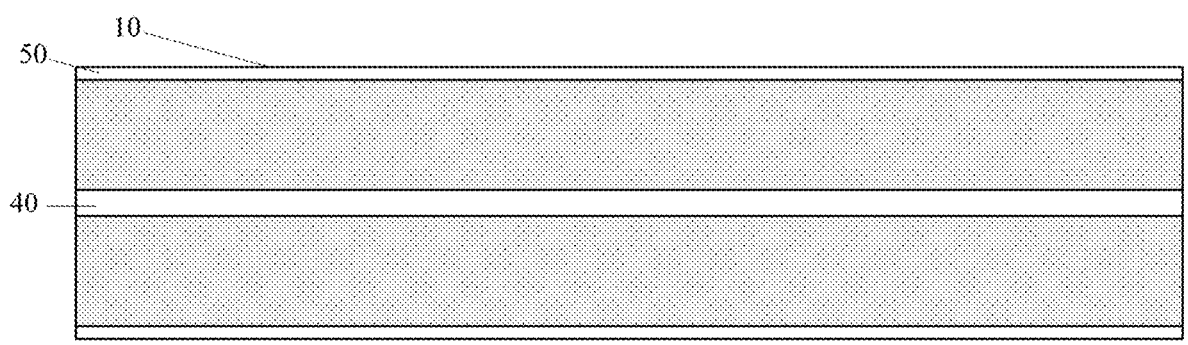
FIG. 4 shows a longitudinal plan view of a longitudinal plate according to an embodiment of the invention.

According to the present invention, as shown in FIG. 2, each longitudinal plate member 20 comprises a pair of profiled plates 21. The two profiled plates 21 are arranged opposite to each other, with a gap formed therebetween, as shown in FIG. 3. Preferably, an inner end of each profiled plate 21 is higher than an outer end thereof, so that the profiled plate 21 is inclined. As shown in FIG. 3, each profiled plate 21 comprises, along a direction from the inner end (which is close to a center of the housing 10) to the outer end (which is away from the inner end and thus away from the center of the housing 10), a profiled head part 22, a profiled middle part 22, and a profiled tail part 24, which are connected with each other in sequence. As shown in FIG. 3, the paired profiled plates 21 are spaced from each other along a left-right direction, so that the first guiding hole 40 is formed between the profiled head parts 22. The second guiding hole 50 is formed between the profiled tail part 24 and the inner wall of the housing 10. Further preferably, two profiled plates 21 of each longitudinal plate member 20 are symmetrically arranged with respect to a longitudinal centerline of the housing 10, so that the first guiding hole 40 is located at the geometrically highest position of the inner space of the housing 10, which facilitates the oil phase to be discharged and stored in the upper space of the inner chamber of the housing 10. In the actual working process, after the produced fluid enters the inner chamber of the housing 10, it flows through the longitudinal plate member 20, so that most of oil droplets that float upward will accumulate on the lower surface of the profiled middle part 23. The accumulated oil droplets will slide upwards along the inclined surface of the profiled middle part 23 under buoyancy, and will be separated from the produced fluid at the profiled head part 22 to enter the upper space of the housing 10. On the other hand, on the upper surface of the profiled plate 21, the suspended solids slide down along the upper surface of the profiled middle part 23, and are guided by the profiled tail part 24 into the lower space of the housing 10. The longitudinal plate member 20 with this structure can realize oil-water separation excellently.

It should be noted that the present application is not limited to the longitudinal plate member 20 having the above-mentioned configuration. That is, the longitudinal plate member 20 can also be configured in other structures. For example, the longitudinal plate member 20 may include two profiled plates with the same structure as above, but the profiled plates are each obliquely arranged in the inner chamber of the housing 10 in such a way that the inner end of each profiled plate is lower than the outer end thereof, thus forming a general V-shaped structure (not shown) in the inner chamber of the housing 10. This structure is equivalent to one obtained through rotating the oil-water separation device 100 as shown in FIG. 2 by 180 degrees in the circumferential direction. It is readily understood that for this V-shaped longitudinal plate member 20, the first guiding hole is formed between the profiled tail part and the inner wall of the housing 10, while the second guiding hole is formed between two profiled head parts of the paired profiled plates. For another example, the longitudinal plate member 20 can also be configured as having a wave-like shape consisting of folded lines on the axial section. In this form, the first guiding hole is located near or at the peak of the wave while the second guiding hole is located close to or at the trough of the wave. These two longitudinal plate members 20 of different structures are also based on the principle that the oil phase is relatively light and floats up, which is similar to the inverted V-shaped longitudinal plate member 20 shown in FIG. 2 in terms of working principle, and will not be repeated here.

However, compared with the inverted V-shaped longitudinal plate member 20 shown in FIG. 2, the layout of the wave-like longitudinal plate member is somewhat complicated, especially when the internal size of the housing 10 is limited, and the separation effect thereof is less satisfactory. Moreover, the V-shaped longitudinal plate member forces the oil phase to float up from both ends thereof. Compared with the mode that the oil phase floats up in the middle as shown in FIG. 2, the collision probability between oil droplets is reduced, so that the coalescence efficiency is relatively low. By contrast, the mode that the oil phase floats up in the middle can achieve better accumulation of the oil phase in the upper inner space of the housing 10. Therefore, the inverted V-shaped longitudinal plate member 20 shown in FIG. 2 not only has a simple structure and is easy to arrange, but also has a high oil discharge efficiency.

According to the present invention, a lipophilic coating is applied on the lower surface of the profiled plate 21. For example, the lipophilic coating is a nano-silica layer. With this arrangement, small oil droplets can be easily accumulated on the lower surface of the profiled plate 21, which facilitates to improve the efficiency and effect of oil-water separation.

As shown in FIG. 2, a plurality of longitudinal plate members 20 is disposed in the inner chamber of the housing 10. The plurality of longitudinal plate members 20 is arranged at intervals in the vertical direction. That is, these longitudinal plate members 20 are stacked up at a certain distance from each other. The first guiding holes 40 of different longitudinal plate members 20 correspond to each other, and are in through communication with each other in the vertical direction. That is, the inner ends of the profiled head parts 22 at the same side are located on the same vertically extending line. For example, the lateral outlet dimension of the first guiding hole 40 (i.e., the distance between the inner end points of two paired profiled head parts 22 in FIG. 2) may be in a range of 5 to 50 mm. The outlet end (i.e., the outer end of the profiled tail part 24 in FIG. 2) of the second guiding hole 50 has a lateral dimension (i.e., the shortest distance between the outer end point of the profiled tail part 24 and the inner chamber of the housing 10 in FIG. 2) may be in a range of 3 to 50 mm. The longitudinal plate members 20 having a multi-layer structure can function to improve the oil-water separation efficiency greatly.

In the present application, in the cross section, the profiled head parts 22 of different longitudinal plate members 20 have different inclinations. Specifically, the angle formed by a line connecting two ends of the profiled head part 22 and the horizontal direction gradually decreases from top to bottom. It should be noted that in the embodiment shown in FIG. 2 of the present application, since the profiled head part 22 is a straight-line plate, the above-mentioned angle refers to the angle formed by the profiled head part 22 per se and the horizontal direction, which is represented by a in FIG. 2. With the above arrangement, the lower portion of a first guiding hole 40 tends to converge inwardly relative to that of another first guiding hole 40 located below said first guiding hole 40, which offers less and less restrictions on the oil phase considering the oil at an upper position is richer than that at a lower position, thus facilitating the oil phase to float.

In a preferred embodiment, the angle formed between a line connecting two ends of the profiled head part 22 and the horizontal direction is in a range of 30 to 85 degrees. For example, in FIG. 2, the angle between the uppermost profiled head part 22 and the horizontal direction is 85 degrees, while the angle between the lowermost profiled head part 22 and the horizontal direction is 30 degrees.

In the cross section, the profiled tail parts 24 of different longitudinal plate members 20 have different inclinations also. Specifically, from top to bottom, the angle (indicated by b in FIG. 2) formed between a line connecting two ends of the profiled tail part 24 and the horizontal direction gradually increases. That is, the angle of the profiled tail part 24 at a high position relative the horizontal direction is relatively small, while that of the profiled tail part 24 at a low position relative the horizontal direction is relatively large and close to a right angle, so that the suspended solids can easily slide into the lower space of the housing 10. The above-mentioned arrangement improves the sliding efficiency of the suspended solids, thereby enhancing the separation effect.

In a preferred embodiment, the angle formed between a line connecting two ends of the profiled tail part 24 and the horizontal direction is in a range of 30 to 85 degrees. For example, in FIG. 2, the angle between the uppermost profiled tail part 24 and the horizontal direction is 30 degrees, while the angle between the lowermost profiled tail part 24 and the horizontal direction is 85 degrees.

According to the present application, in the inner chamber of the housing 10, the distance between two vertically adjacent longitudinal plate members 20 can be a fixed value, or a variable value. For example, in the direction from top to bottom, the vertical distance between two vertically adjacent profiled middle parts 23 decreases gradually. That is, the longitudinal plate members 20 are distributed in the lower space of the inner chamber of the housing 10 in a denser way than in the upper space thereof. This arrangement optimizes the layout of the longitudinal plate members 20. During the separation, since the oil droplets in the lower space of the housing 10 are smaller in terms of particle size than those in the upper space, the longitudinal plate members 20 densely distributed can increase the collision probability of oil droplets, shorten the migration distance of oil droplets, and thus improve the coalescence effect of oil droplets.

According to the present invention, a communication hole (not shown in the drawings) communicating with the flow channel 30 is provided on the profiled middle part 23 of at least one longitudinal plate member 20 arranged in the lower space of the housing 10. The specific longitudinal plate member 20 on which the communication hole is arranged can be selected according to actual work needs. For example, in an embodiment with eight longitudinal plate members 20 arranged one above the other as shown in FIG. 2, communication holes may be provided on the profiled middle part 23 of each of three longitudinal plate members 20 from the lowermost one. Specifically, the communication holes may be through holes drilled out through the profiled middle parts 23, which are arranged at intervals in the longitudinal direction of the profiled middle parts 23. With this arrangement, the turbulence of the produced fluid in the lower space of the housing 10 can be enhanced, thus facilitating the collision and coalescence of oil droplets.

According to the present invention, the angle (indicated by c in FIG. 2) formed by a line connecting between two ends of the profiled middle part 23 and the horizontal direction is in a range of 15 to 60 degrees, for example, 35 degrees.

According to the present invention, the profiled middle part 23 may be a straight-line plate, or a folded-line plate including a plurality of folded-line segments 25 that are not on the same straight line. Preferably, an angle (indicated by d in the drawing) formed between the upper surfaces of two adjacent fold-line segments 25 is in a range of 130 to 240 degrees. With this arrangement, the inclination of the whole profiled middle part 23 is relatively gentle, so as not to affect the floating-up of the oil phase and the downward sliding of the suspended solids. Moreover, this arrangement can properly increase the contact area between the profiled middle part 23 and the oil droplets to some extent, thereby improving the oil-water separation efficiency.

In the present application, a plurality of (for example, three or four) collection pipes 60 spaced from each other are arranged at the downstream end of the housing 10, in order to collect oil in time and avoid inter-phase interference. The collection pipes 60 may be arranged at equidistant intervals, or at unequal intervals. For example, in the direction from upstream to downstream, the distance between two adjacent collection pipes 60 gradually increases. A valve is provided on the collection pipe 60 to control the water-oil ratio.

In the actual production process, the size of the oil-water separation device 100 can be adjusted appropriately.

In one embodiment, the housing 10 has a longitudinal length of 8 m and an inner diameter of 200 mm. In the housing 10, eight longitudinal plate members 20 are arranged vertically with an equal distance between two adjacent ones. The uppermost longitudinal plate member 20 is 20 mm from its highest end to the highest point of the inner wall of the housing 10. The vertical distance between two vertically adjacent longitudinal plate members 20 is 20 mm. The transverse outlet size of the first guiding hole 40 is 10 mm. The transverse outlet size of the second guiding hole is 5 mm. On the top wall at the downstream end of the housing 10, a total of three oil phase collection pipes 60 each with an inner diameter of 100 mm are equidistantly arranged, and the distance between two adjacent oil phase collection pipes 60 is 800 mm.

In another embodiment of the present invention, the parameters of the oil-water separation device are as follows. The length of the housing 10 is 12 m, and the inner diameter thereof is 250 mm. In the housing 10, eight longitudinal plate members 20 are arranged vertically and spaced from each other. The uppermost longitudinal plate member 20 is 30 mm from its highest end to the highest point of the inner wall of the housing 10. The vertical distance between the first and second longitudinal plate members 20 is 20 mm. The transverse outlet size of the first guiding hole 40 is 12 mm. The transverse outlet size of the second guiding hole is 6 mm. On the top wall at the downstream end of the housing 10, a total of four oil phase collection pipes 60 each with an inner diameter of 150 mm are equidistantly arranged, and the distance between two adjacent oil phase collection pipes 60 is 1000 mm.

Tests showed that when being used to treat wellhead produced fluid with a crude oil density of 0.88 $g/cm^3$ and a water content of 95%, the oil-water separation device 100 of the present application can separate 70% of water in the produced fluid therefrom, with an oil content less than or equal to 30 mg/L in the water obtained. This means an excellent oil-water separation effect.

Although the principle of the present invention is described above in conjunction with the device for phase separation of wellhead produced fluid, it can be understood that the principle of the present invention can be equally applied to the treatment of municipal sewage and industrial sewage.

While the present invention has been described above with reference to the preferred embodiments, various modifications can be made and components can be replaced with equivalents thereof without departing from the scope of the present invention. In particular, as long as there is no structural conflict, the technical features mentioned in different embodiments can be combined with each other in any manner. The present invention is not limited to the specific embodiments disclosed herein, but includes all technical solutions falling within the scope of the claims.

The invention claimed is:

1. An oil-water separation device, comprising:
   a housing;
   a plurality of longitudinal plate members, each longitudinal plate member is inclined relative to a horizontal direction and arranged along a longitudinal direction of the housing, which forms one flow channel in an inner chamber of the housing;
   a first guiding hole, provided on each longitudinal plate member, which is in communication with the flow channel;
   a second guiding hole, provided between each longitudinal plate member and the inner wall of the housing, which is in communication with the flow channel and has a geometric position lower than that of the first guiding hole; and
   a collection pipe, arranged at a longitudinal downstream end of the housing, which is in communication with the inner chamber of the housing through a top wall of the housing,
   wherein each longitudinal plate member comprises a pair of profiled plates arranged opposite to each other with an interval therebetween, each profiled plate is obliquely arranged, having an inner end higher than an outer end thereof, and
   each profiled plate includes a profiled head part, a profiled middle part and a profiled tail part that are connected with each other in sequence in a direction from the inner end to the outer end,
   wherein the first guiding hole is formed between the profiled head parts of said two profiled plates, and the second guiding hole is formed between the profiled tail parts and the inner wall of the housing,
   wherein the plurality of longitudinal plate members are positioned one above another in the inner chamber of the housing along a vertical direction, the plurality of first guiding holes of the plurality of longitudinal plate members being in through communication with each other, and
   each longitudinal plate member has a first angle formed by a line connecting two ends of the profiled head part and the horizontal direction, and in any of two adjacent longitudinal plate members, the first angle of the longitudinal plate member located above is larger than the first angle of the longitudinal plate member located below.

2. The oil-water separation device according to claim 1, wherein a lipophilic coating is applied on a lower surface of the profiled plate.

3. The oil-water separation device according to claim 1, wherein each longitudinal plate member has a second angle formed by a line connecting two ends of the profiled tail part and the horizontal direction, and in any of two adjacent longitudinal plate members, the second angle of the longitudinal plate member located above is smaller than the second angle of the longitudinal plate member located below.

4. The oil-water separation device according to claim 1, wherein two profiled middle parts of two adjacent longitudinal plate members amongst the plurality of longitudinal plate members has a vertical distance so as to provide a plurality of vertical distances, and the plurality of vertical distances gradually decrease or are the same in the direction from top to bottom.

5. The oil-water separation device according to claim 1, wherein the profiled middle part of at least one of the plurality longitudinal plate members is provided with a communication hole which is in communication with flow channels above and under said profiled middle part.

6. The oil-water separation device according to claim 1, wherein the profiled middle part includes a plurality of folded-line segments that are not on a same straight line, two adjacent folded-line segments being fixedly connected with each other.

7. The oil-water separation device according to claim 6, wherein an angle formed between the upper surfaces of two adjacent folded-line segments is in a range of 130 to 240 degrees.

8. The oil-water separation device according to claim 1, wherein an angle formed by a line connecting two ends of the profiled head part and the horizontal direction is in the range of 30 to 85 degrees.

9. The oil-water separation device according to claim 1, wherein an angle formed by a line connecting two ends of the profiled tail part and the horizontal direction is in a range of 30 to 85 degrees.

10. The oil-water separation device according to claim 1, wherein an angle formed by a line connecting two ends of the profiled middle part and the horizontal direction is in a range of 15 to 60 degrees.

11. The oil-water separation device according to claim 1, wherein a plurality of collection pipes longitudinally spaced from each other is arranged at the downstream end of the housing, the distance between two adjacent collection pipes being equal or gradually increased in a direction from upstream to downstream.

* * * * *